United States Patent [19]
Brown et al.

[11] Patent Number: 6,101,585
[45] Date of Patent: Aug. 8, 2000

[54] MECHANISM FOR INCREMENTAL BACKUP OF ON-LINE FILES

[75] Inventors: Randall P. Brown, Litchfield, N.H.; Stanley Luke, Acton, Mass.; Paul Richard Shaughnessy, Hollis, N.H.

[73] Assignee: Adaptec, Inc., Milpitas, Calif.

[21] Appl. No.: 08/963,905

[22] Filed: Nov. 4, 1997

[51] Int. Cl.[7] .................................................. G06F 12/16
[52] U.S. Cl. ........................................ 711/162; 707/204
[58] Field of Search .................................... 711/161, 162; 714/6, 7, 5; 707/202, 204

[56] References Cited

U.S. PATENT DOCUMENTS

| | | | |
|---|---|---|---|
| 5,263,154 | 11/1993 | Eastridge et al. | 714/6 |
| 5,794,254 | 8/1998 | McClain | 707/204 |
| 5,835,953 | 11/1998 | Ohran | 711/162 |
| 5,875,479 | 2/1999 | Blount et al. | 711/162 |
| 5,907,672 | 5/1999 | Matze et al. | 714/8 |

*Primary Examiner*—Do Hyun Yoo
*Assistant Examiner*—Gary J. Portka
*Attorney, Agent, or Firm*—Cesari and McKenna, LLP

[57] ABSTRACT

A backup mechanism enables incremental backup operations for on-line files of a computer system having an archive bit attribute associated with each file. The mechanism comprises an archive bit change number (ABCN) attribute that is also associated with each file and that is manipulated by a file system of the computer to reflect a correct value of the archive bit when the file is modified during a current backup operation. The ABCN attribute is incremented each time the file is modified to ensure that the file is accurately copied to secondary backup storage during a subsequent incremental backup operation. The mechanism thus enables reliable on-line file modifications which, in turn, substantially increases the efficiency of the computer system.

8 Claims, 8 Drawing Sheets

MECHANISM FOR INCREMENTAL BACKUP OF ON-LINE FILES

BACKGROUND OF THE INVENTION

1. Field of the Invention

The invention relates to a method for enabling incremental backup on a computer system with an on-line file system having an archive bit attribute associated with each file.

2. Description of the Related Art

Computer systems often perform incremental data backups on computer files to enable recovery of lost data. To maintain the integrity of the backed-up data, the backup process must accurately back up all files modified after the most recent backup process. In order to identify modified files, computer file systems using a DOS or a Windows NT operating system have an archive bit in each file in a directory structure. After an application modifies a file, the operating system sets the value of the archive bit to indicate that the file needs to be archived. When a backup program starts, it searches for all files in the directory structure with the archive bit set. The backup program copies each such file to a secondary storage device. Then it verifies the backed up files and it clears the archive bit on each file after a complete backup of that file.

A problem with using only the archive bit to flag modified files is, if a previously modified file is opened and subsequently modified during the backup operation, the archive bit associated with the file will not reflect the correct value. Specifically, when the backup program clears the archive bit after a complete file backup, the archive bit value will incorrectly reflect the subsequent changes made during the backup process. If no additional modifications to this file occur before the next backup operation, the archive bit value will remain incorrect and the file will not be selected for backup in the next backup execution. This lapse in backing up the file modification could result in the loss of important data should the system crash before the archive bit value is corrected and the file is backed up.

To avoid this problem, some backup programs do not back up open files but strictly operate on files in a "read-only" state. If a file is on-line and in a "read-write" state, the backup programs skip that file. This approach raises the problem of on-line modification made during the backup process. If the system crashes before the next scheduled backup, the data owner loses all modifications made before, during, and after the previous backup. Some network administrators solve this problem by forcing all users to log off the system before backup execution begins. Others solve this problem by shutting down the system, pre-scanning all files in the directory structure, recording all the files that need to be archived, and thereafter clearing all archive bits in the directory structure. The pre-scanning and recording time in the second method increases as the files in the directory structure increase. While these attempts ensure that all files are closed and in the "read-only" state, it reduces user productivity. For businesses that require high availability, i.e., twenty-four hours/seven days a week on-line activity, these solutions are unacceptable.

A solution to the productivity issue involves periodically performing a copy-on-write procedure on each on-line storage device whereby, the system takes a "snapshot" or copy of the data from the on-line storage devices at a particular instant in time. On-line storage devices are configured from on one or more disks into logical units of storage space referred to herein as "containers". The copy-on-write procedure is described in a co-pending U.S. patent application Ser. No. 08/963,754 entitled System and Method for Real-Time Data Backup Using Snapshot Copying with Selective Compaction of Backup Data, which application hereby incorporated by reference as though fully set forth herein.

During the copy-on-write procedure, a read-only snapshot container is also created and the snapshot is stored in the snapshot container. In addition to the contents of the file, the snapshot container contains attributes of the file such as the value of the archive bit. The file contents in the snapshot container are preferably an identical copy of the file contents in the read-write on-line container at the instant the snapshot was taken. This enables users to work on the files in the read-write on-line container while the backup program backs up files from the snapshot container. During the backup operation, the backup program backs up the files from the snapshot container and clears the archive bits in the files in the snapshot container to indicate that the files have been backed up. After a complete backup operation, the system deletes the snapshot container. However, the archive bits in the associated files in the read-write on-line container remain set and do not reflect the clear archive bit operation performed by the backup process. This may eventually lead to a situation where all files in the read-write on-line container have their archive bits set; thus the system performs a full system backup during every backup operation. The copy-on-write procedure resolves the productivity issue but it does not resolve the problem of an archive bit that inaccurately reflects the state of a file and it does not resolve the problem with on-line file modification occurring during the backup process.

One attempt to solve the on-line modification problem involves performing a full system backup every time the files are backed up. A full system backup ensures that every file on the system is copied to secondary storage. However, such operations substantially increase the time and storage resources needed to perform backups. Moreover, users may be unable to access the files during a full system backup. Accordingly, the cost of performing such backups is greater in terms of user productivity and/or system resources.

To allow data recovery Window NT File System(NTFS) was designed as a recoverable file system. In case of an emergency, NTFS automatically reconstructs disks containers the first time a disk is accessed. NTFS then returns the data to a consistent state. NTFS also uses redundant storage for its vital sectors, so that if one location on the disk is bad, the file system can still access the container's critical file system data. The NTFS recovery capabilities ensure that the file system on a container remains accessible but there is no guarantee of complete recovery of user files.

For businesses that cannot afford to lose user data, Windows NT also allows users the ability to "plug in" fault tolerant disks storage. Fault tolerant drivers in the operating system "mirror" or duplicate data from on-line disks on to the fault tolerant storage devices to ensure that a redundant copy can always be recovered. While this further ensures that users can recover their data, it is more expensive than backing up files using the copy-on-write approach. NTFS mirror recovery requires the system administrator to always keep a duplicate copy of the data, whereas the copy-on-write approach allows the system administrator the flexibility to determine when to create the snapshot. After the backup execution completes, the system administrator discards the snapshot container. Thus, the system administrator in a copy-on-write situation only has to maintain the duplicate copy on the snapshot container for a limited time.

As noted, the problem with the current backup processes is that on-line files either cannot be backed up at all or cannot be backed up reliably. Therefore, it is an object of the present invention to provide a process that allows on-line files to be backed up reliably while maintaining the integrity of the backed up data and reflecting the true state of the archive bit.

Another object of the invention is to allow users to continue to work on files during backup operations.

Yet another object of the invention is to obviate the need for a full backup every time a backup operation is performed.

Still yet another object of the present invention is to provide an on-line file backup system that does not require specialized drivers and specialized disks storage.

SUMMARY OF THE INVENTION

The invention comprises a method for enabling incremental backup operations by converting a backed up file ID to a read-write file ID and comparing an archive bit change number (ABCN) attribute in the read-write file ID with the ABCN attribute in the backed up file ID. The ABCN attribute is associated with each file and is manipulated by a file system of the computer to reflect a correct value of the archive bit when the file is modified during a current backup operation. Specifically, the novel ABCN attribute is incremented each time the file is modified to ensure that the file is accurately copied to secondary backup storage during a subsequent incremental backup operation. The method thus enables reliable on-line file modifications which, in turn, substantially increases the efficiency of the computer system.

In an illustrative embodiment of the invention, the incremental backup operation is performed on a read-only "snapshot" container whose contents are duplicated from a read-write container. A backup application program executing on the computer typically instructs the file system to clear the archive bit in a snapshot file after copying the file from the snapshot container to a secondary storage device. If the system only clears the archive bit in the snapshot file, then the back up operation will not be reflected in the read-write container file. However, it is possible that the read-write file was further modified and stored on the read-write container during the backup operation; if the read-write file archive bit is also cleared, the archive bit associated with the read-write file would thus incorrectly reflect the modified state of the file.

According to the invention, the file system increments the ABCN associated with the read-write file when the file is modified and thereafter stored on the read-write container. Instead of clearing the archive bit in a snapshot file after a backup operation, the file system converts a container ID in the snapshot file ID to a read-write container ID and locates the associated read-write file with the identical file ID as the snapshot file. Then it compares the ABCN in the read-write file with the ABCN in the snapshot file. If the ABCN attributes match, the file system clears the archive bit in the read-write file. If the ABCN attributes do not match, the archive bit is not cleared and the state of the file in the read-write container is thereafter correctly reflected as a candidate for backup during the next incremental backup operation.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
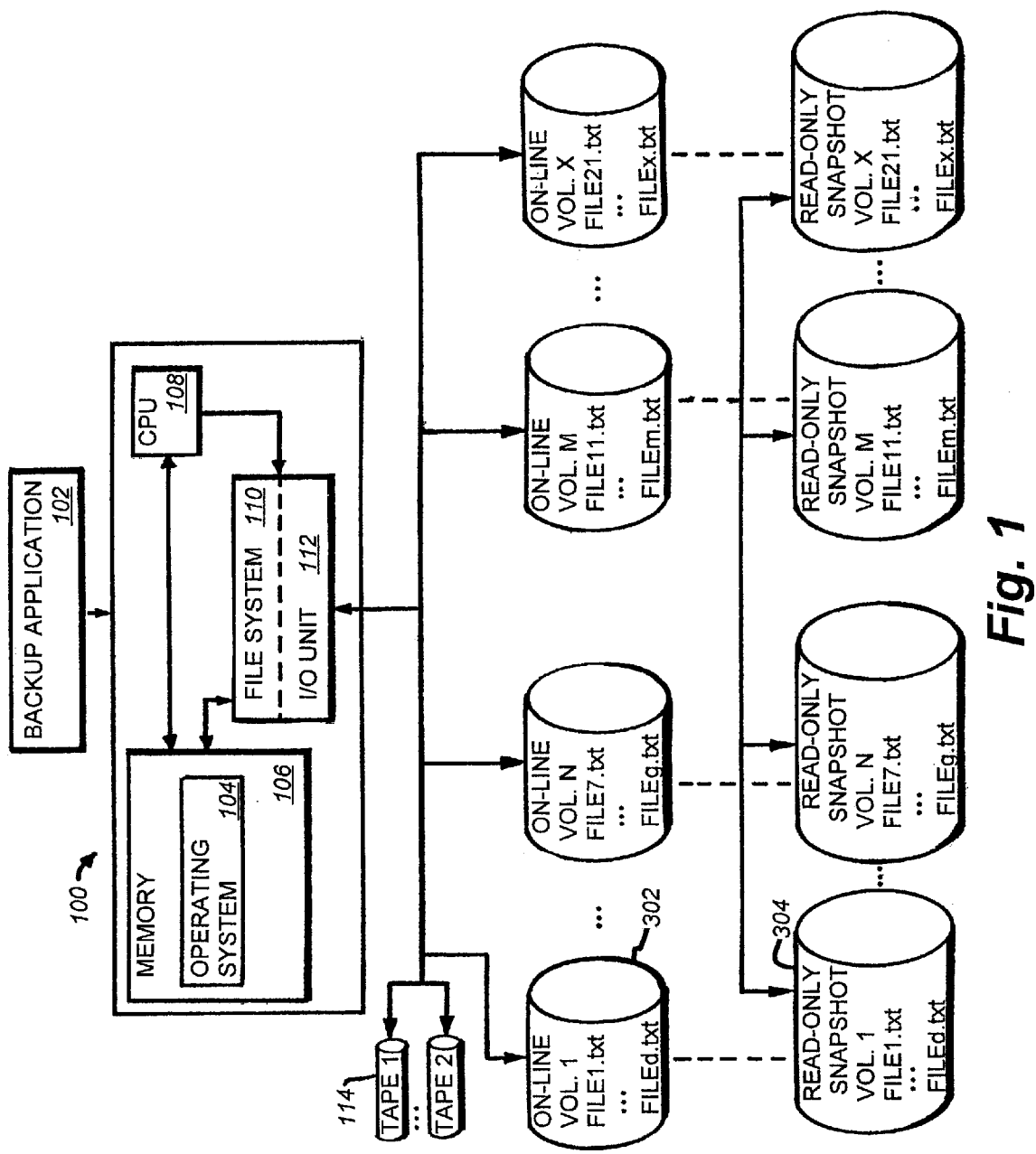
FIG. 1 is a schematic block diagram of a computer system in which the principles of the invention may be practiced.

FIG. 1 is a schematic block diagram of a computer system 100 that is configured to perform backup operations in accordance with the present invention. The computer system comprises a memory 106 and an input/output (I/O) unit 112 interconnected with a central processing unit (CPU) 108. The I/O unit 112 is, in turn, connected to on-line 302 and secondary storage devices 114. The memory 106 comprises storage locations addressable by the CPU 108 and I/O unit 112 for storing software programs and data structures associated with the inventive backup mechanism described herein. An operating system 104, portions of which are typically resident in the memory 106 and executed by the CPU 108, functionally organizes the computer by, inter alia, handling I/O operations invoked by software processes or application programs executing on the computer. An example of such an application program is a backup application 102. It will be apparent to those skilled in the art that other CPU 108 and memory 106 means, including various computer readable media, may be used for executing and storing data structures pertaining to the described backup mechanism.

The operating system 104 implements a file system 110 to logically organize information stored on the on-line 302 and secondary storage devices 114 as a hierarchical structure of files. The file system 110 is a high-level software entity comprising a collection of program modules, e.g., software drivers, that incorporate a command set for the storage devices. Files stored on the storage devices 114, 302, 304 typically contain user data and associated file attributes such as an archive bit 208. In the illustrative embodiment, the operating system is preferably the Windows NT operating system (hereinafter "Windows NT") developed by Microsoft Corporation, although it should be understood that the invention described herein may function with any operating system (such as DOS) having such an archive bit 208 file attribute.

Figures 2, 3, 4:
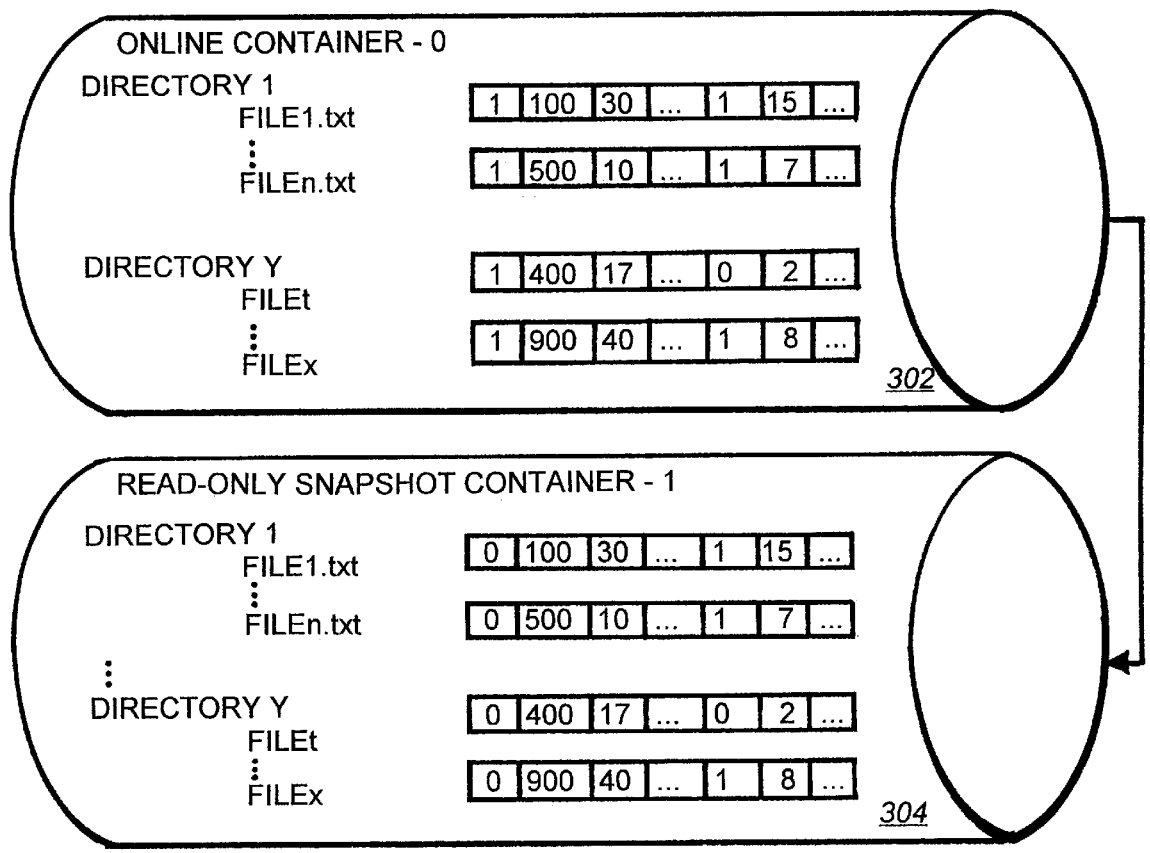
FIG. 2 is a schematic block diagram illustrating attributes associated with a file.
FIG. 3 is a schematic block diagram showing the contents of an on-line disk container and of a snapshot container during a copy-on-write operation.
FIG. 4 is a schematic diagram showing an expanded file ID structure including an archive bit change number (ABCN) attribute in accordance with the invention.

FIG. 2 is a schematic diagram 200 showing the attributes associated with a file. Each file of a file system 110 contains a file ID comprising a file system ID or container ID 202 which identifies a container that logically stores the file. An i-node number 204 uniquely identifies a file on the file system and a generation number 206 identifies an iteration of the i-node 204 used by the file. As is known to those skilled in the art, the archive bit 208 is used to signify when its associated file has been modified and, thus, is a candidate for a backup operation.

Typically, a backup operation is performed at the request of a computer operator. In an illustrative backup approach embodiment, the file system 110 instructs the I/O unit 112 to perform a conventional "copy-on-write" operation in response to the operator's request. The copy-on-write operation directs the I/O unit 112 to first duplicate the contents of a read-write on-line system disk container 302 to a read-only container 304 and then to create a "snapshot" container from that latter container. The snapshot container 304 is an identical image of the read-write on-line container 302 at an instant in time. Alternatively, the file system 110 may invoke a mirror disk recovery approach instead of copy-on-write. Mirror disk recovery is typically used when fault tolerant disk storage is required. Fault tolerant disk storage "mirrors" or duplicates data from an on-line system container 302 to a mirrored fault tolerant container. In any event, the backup application 102 proceeds with a current backup operation by copying the file contents from either the snapshot container or mirrored fault tolerant container 304 to the secondary storage devices 114.

Specifically, the file system 110 directs the I/O unit 112 to access the snapshot container 304 to retrieve all files for storage in the computer memory 106. The backup application 102 then searches the memory 106 for these "read-only" files with their archive bits 208 asserted. Upon locating such files, the backup program 102 copies them to a secondary storage device 114, such as tape. When each file is completely "backed up", the backup application 102 instructs the file system 110 to deassert the file's associated archive bit 208 in the snapshot container. Illustratively, the application 102 issues a clear archive bit instruction to the file system 110, which passes the instruction to the I/O unit 112 for execution on the file.

FIG. 3 is a schematic block diagram 300 showing the contents of an on-line container 302 and a snapshot disk container 304 during a copy-on-write operation. At an instant in time chosen by the operator, such as a network administrator, a copy-on-write operation is performed to copy data once per "snapshot" region of the on-line container 302. This results in the data on the snapshot container 1 304 being identical with the data on the read-write on-line container 0 302 at that instant. Most file attributes on the snapshot container (e.g., the archive bit 208, the i-node number 204 and the generation number 206) retain the same state as the file attributes on the on-line container 302. However, the container ID 202 for each file on the snapshot container 304 is modified to reflect the transition from the on-line container 302 to the snapshot container 304. According to the invention, before executing the clear archive bit command issued by the backup program, the file system 110 converts the container ID 202 on the backed up file from the snapshot 304 to the on-line container 302. This ensures that if no modifications are made after the copy-on-write operation or during the backup process the file attributes on the backed up file and the read-write on-line file are identical.

Yet if the file was further modified and stored on the on-line container 302 prior to completion of the current backup operation, clearing of the archive bit 208 associated with the file would incorrectly reflect the modified state of the file. Such an event renders incremental backup operations impractical using the described backup approaches.

The present invention is therefore directed to a process for enabling reliable incremental backup operations for on-line files having an archive bit 208 attribute associated with each file.

In addition to converting the container ID in the snapshot file, the method uses an archive bit change number (ABCN) attribute 410 that is associated with each file and that is manipulated by the file system 110 to reflect a correct value of the archive bit 208 is when the file is modified during a current backup operation. FIG. 4 is a schematic diagram 400 showing an expanded file ID structure including the novel ABCN attribute 410 associated with a file. As shown, the expanded file ID structure includes a file system ID or container ID 402, I-node number 404, generation number 406 and archive bit 408, like those already described herein. Notably, the ABCN attribute 410 is incremented each time the file is modified to ensure that the file is accurately copied to secondary backup storage 114 during a subsequent incremental backup operation. The method thus enables reliable on-line file modifications which, in turn, substantially increases the efficiency of the computer system.

According to the invention, the file system 110 increments the ABCN 410 associated with the file when the file is modified and thereafter stored on the read-write on-line container 302. Instead of performing the clear the archive bit 208 command issued by the backup program on a file in snapshot container 304, the file system 110 locates the associated file in the read-write on-line container 302 by converting the file container ID 202 attribute from the snapshot container 304 to the on-line container 302. This creates a snapshot file with identical attributes and contents as an unmodified read-write on-line file. Then the system compares the ABCN 410 in read-write on-line file 302 with the ABCN 410 in the snapshot file 304. If the ABCN 410 attributes match, the file system 110 clears the archive bit 208 associated with the file stored on the read-write on-line container 302. If the ABCN 410 attributes do not match, the archive bit 208 is not cleared and the state of the file is thereafter correctly reflected on the read-write on-line container 302 as a candidate for backup during the next incremental backup operation.

Figure 5:
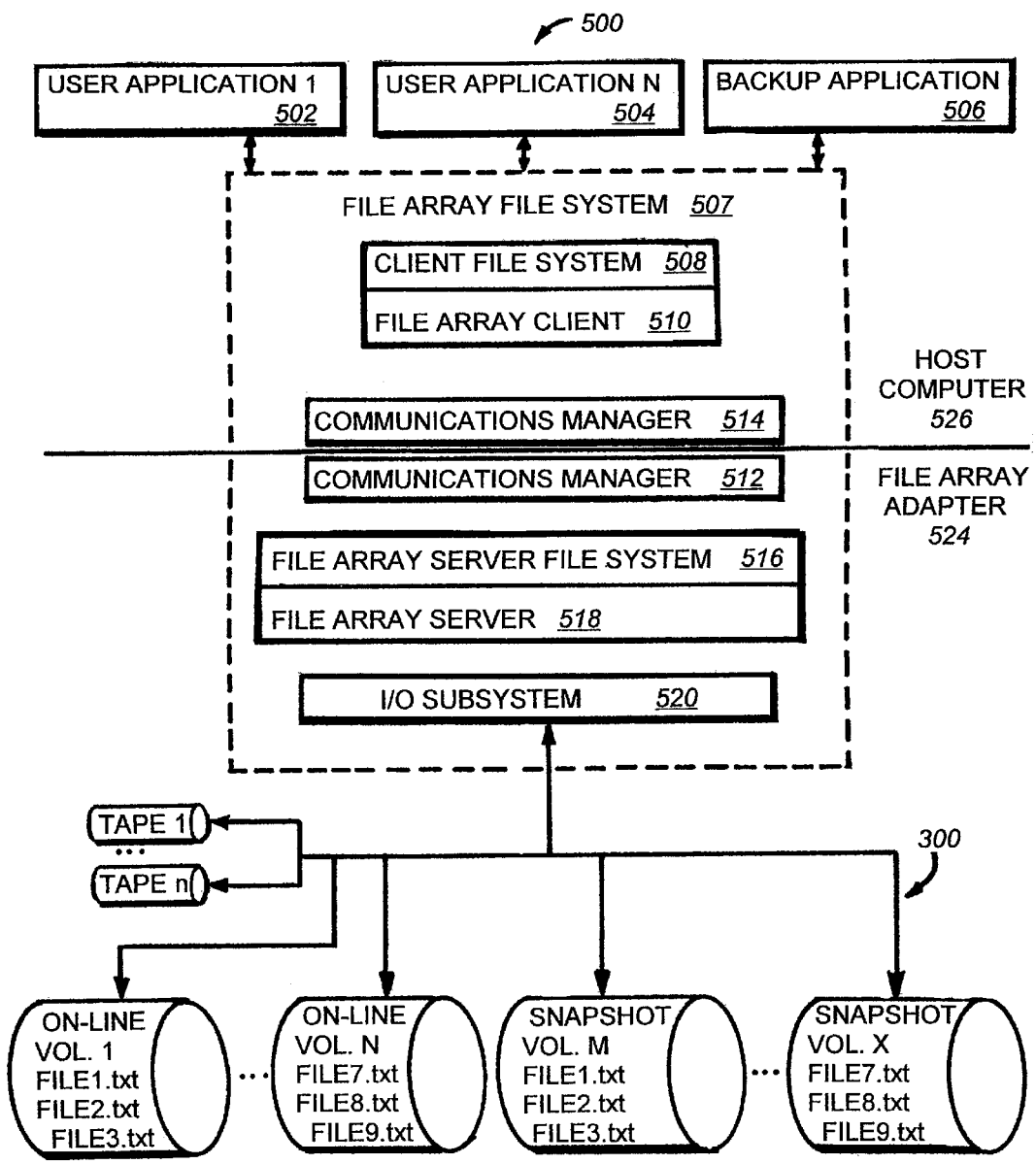
FIG. 5 illustrates an illustrative embodiment of a data processing system having a distributed file system architecture configured to implement the ABCN attribute.

FIG. 5 depicts an illustrative embodiment of a data processing platform having a distributed file system architecture 500 configured to implement the ABCN 410 attribute mechanism. The data processing platform 500 comprises a host computer 526 coupled to a file array adapter 524 over a low latency interface. The distributed file array system architecture 500 includes a file array file system 507 which is preferably implemented in accordance with a modified client-server computing model. That is, the file system includes a client file system 508 located on the host computer 526 and a server file system 516 resident on the adapter 524. The client file system 508 comprises a file array client 510 software driver component that interfaces with a communications manager software component 512; this latter component exchanges and processes I/O requests/responses over the interface with a complementary communications manager 514 of the adapter 524. The server file system 516 comprises, inter alia, a file array server driver 518 component. In addition, the architecture 500 includes a file array I/O subsystem 520 that is located entirely on the adapter 524. An example of the copy-on write procedure is described in copending and commonly-assigned U.S. patent application Ser. No. 08/963,754 entitled System and Method for Real-Time Data Backup Using Snapshot Copying with Selective Compaction of Backup Data, by Chris Franklin, which application is hereby incorporated by reference as though fully set forth herein.

When performing I/O operation requests in support of a user application program executing on the platform, the client file system 508 initially attempts to resolve the request at the host computer 526; if it cannot, the client 508 sends commands to the server 516 for execution by server 516 or the I/O subsystem 520 of the file array adapter 524. In the case of an incremental backup operation involving the expanded file ID 400, the communications protocol between the client file system 508 and server file system 516 is expanded to include the ABCN attribute 410.

Figure 6A:
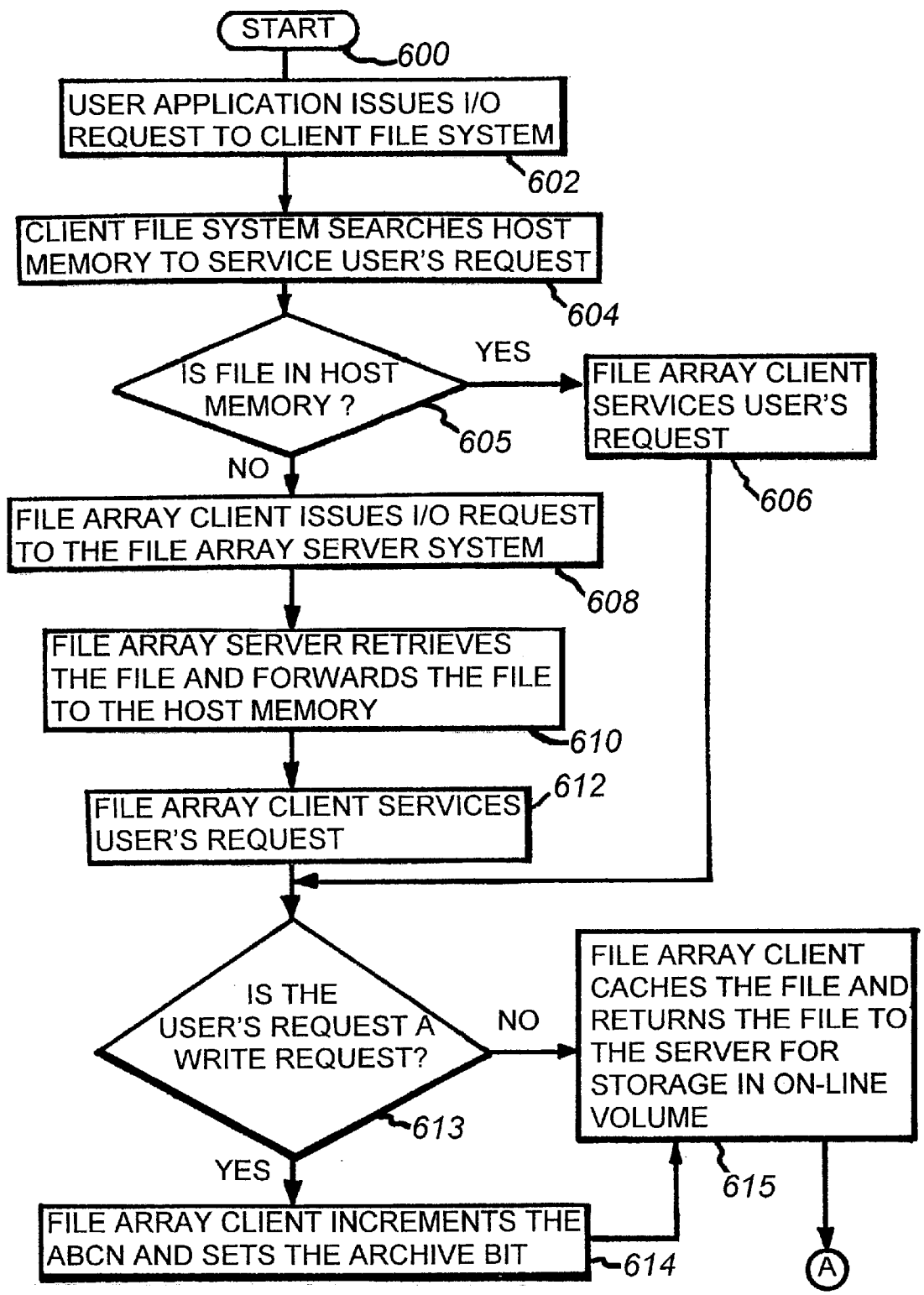
FIGS. 6A and 6B is a flowchart illustrating the sequence of steps followed by a backup process in the preferred embodiment in FIG. 5.

FIG. 6A is a flowchart illustrating the sequence of steps employed when performing an incremental backup operation on the distributed file system platform in accordance with the invention. The sequence starts at Step 600 and proceeds to Step 602 where the user application issues an I/O request (via an applications programming interface or function call) for a file to the client file system 508. The file array client 510 searches host memory for the file (Step 604) and if it is present in the memory (Step 605), the file array client driver 510 services the request at Step 606. If the file is not in host memory (Step 605), the file array client 510 cooperates with the communication manager 512, 514 to issue an I/O request to the server file system 516 in Step 608. The file array server 516 retrieves the file either from adapter memory or from an on-line container through the I/O subsystem 520 and forwards the file to the host memory in Step 610. In Step 612, the file array client 510 services the user's request and, if the request is a write request(Step 613), increments the ABCN and asserts the archive bit (Step 614) prior to returning the file to the server for storage on the on-line container (Step 615). Preferably, copies of the file (i.e., the "on-line file") are maintained in host memory and adapter memory.

Figure 6B:
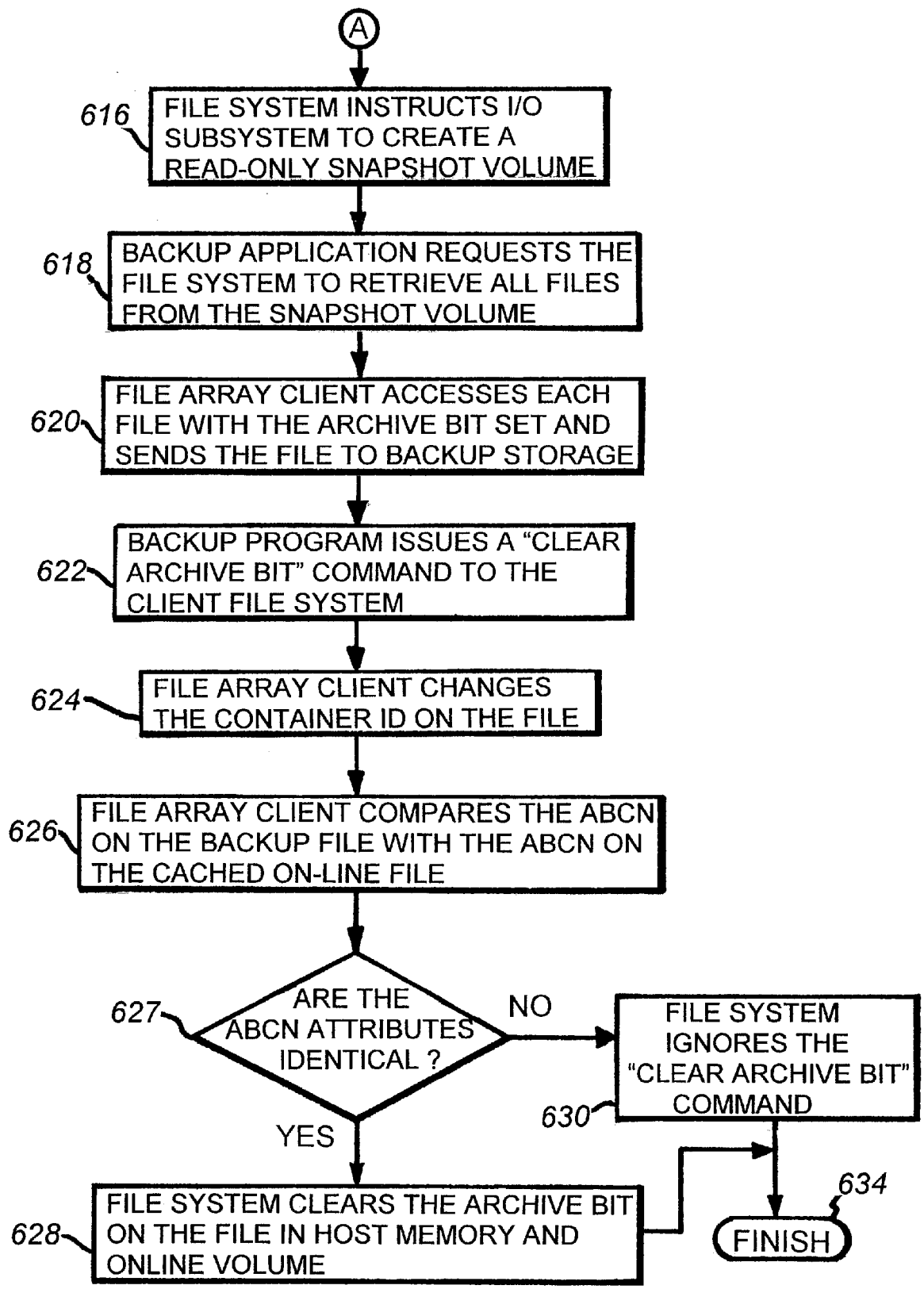

Thereafter, in FIG. 6 B a system administrator instructs the file system to perform a copy-on-write operation before executing the backup application 506. In response to this instruction, the file system 516 instructs the I/O subsystem 520 to create a read-only, snapshot container from the read-write on-line container in Step 616. The backup application then issues a request to the file system 508 to retrieve all files from the snapshot container in Step 618. The file array client 510 accesses each file having an asserted archive bit and, in response to a backup instruction from the application, forwards each file to the server for storage on secondary storage (Step 620). The backup program then issues a clear archive bit command to the client file system 508 in Step 622 to clear the archive bit of the file (i.e., the "backed up file") in the snapshot container. In response to this command, the file array client 510 changes the container ID on that file from the snapshot container ID to the on-line container ID in Step 624. Note that if the copy of the file stored on the on-line container is modified after the snapshot is taken, the file ID of the backed up file will be different from the on-line file ID because the archive bit of the file is asserted and its ABCN is incremented by the file system.

In accordance with the invention, the file array client 510 then compares the ABCN of the backed up file with the ABCN of the cached on-line file in Step 626. If the ABCN attributes are identical(Step 627), the client 510 clears the archive bit on the backed up file in Step 628. If the ABCN attributes are not identical, the client file system 508 ignores the clear archive bit command in Step 630. The client file system 508 also issues the clear archive bit command to the server file system 516 for similar manipulation of these attributes associated with copies of the backed up and on-line files in the online container. The sequence for the incremental back up program then ends at Step 634.

Figure 7:
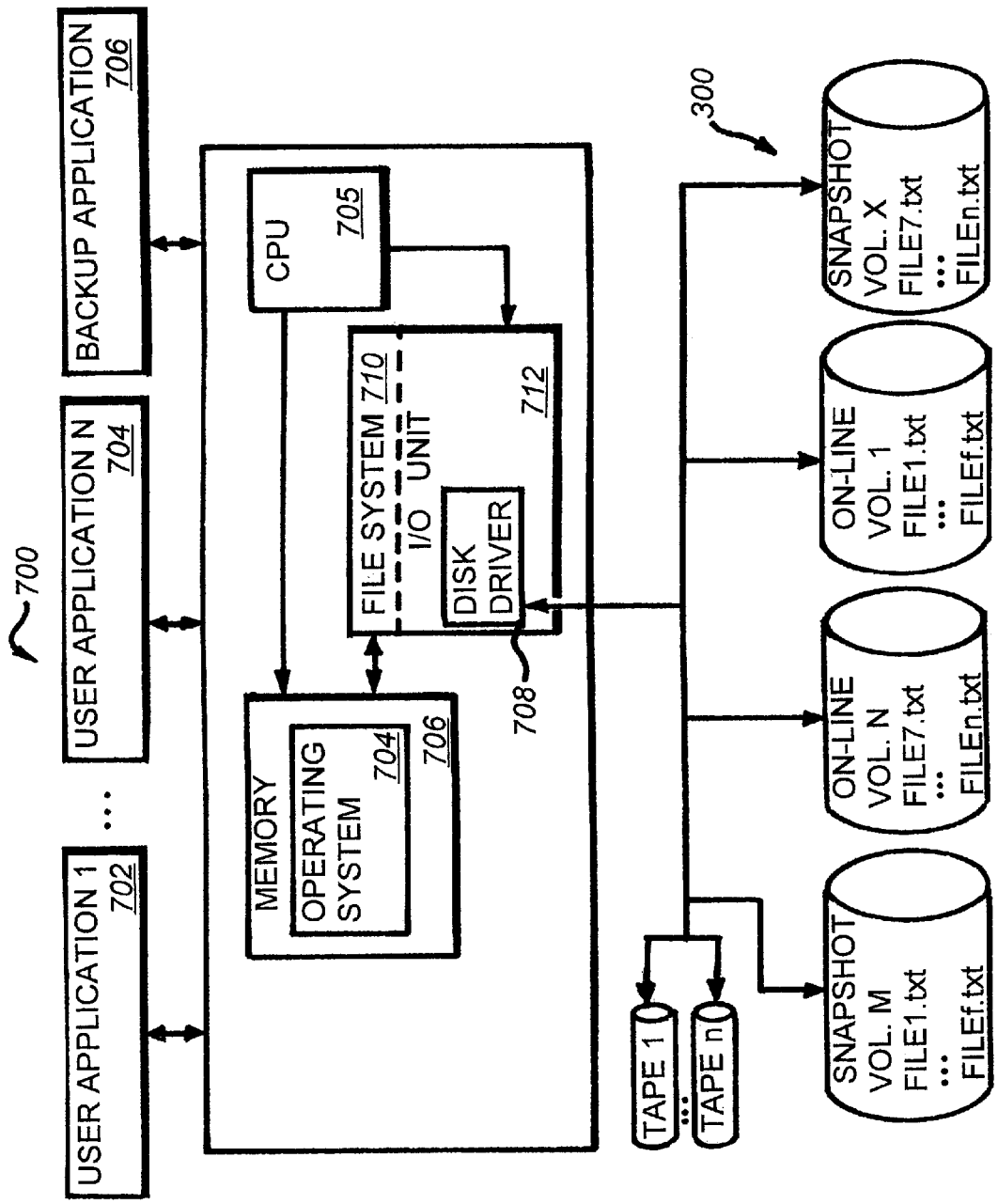
FIG. 7 illustrates an alternative embodiment of a data processing system configured to implement the ABCN attribute.

While there has been shown and described an illustrative embodiment of a mechanism that enables incremental backup operations for on-line files of a computer system having an archive bit attribute associated with each file, it is to be understood that is various other adaptations and modifications may be made within the spirit and scope of the invention. For example in an alternate embodiment of the invention, the file system of the data processing platform need not be distributed but may, in fact, be resident on the host computer. FIG. 7 depicts such an alternative embodiment of a data processing platform configured to implement the ABCN attribute mechanism; an example of this file system is the Windows NT File System (NTFS) configured to operate on the Windows NT operating system. When performing I/O operation requests in support of a user application program executing on the platform, the file system initially attempts to resolve the request by searching the host computer memory; if it cannot, the file system services the request by retrieving the file from disks through the appropriate I/O driver of the I/O subsystem.

Figure 8A:
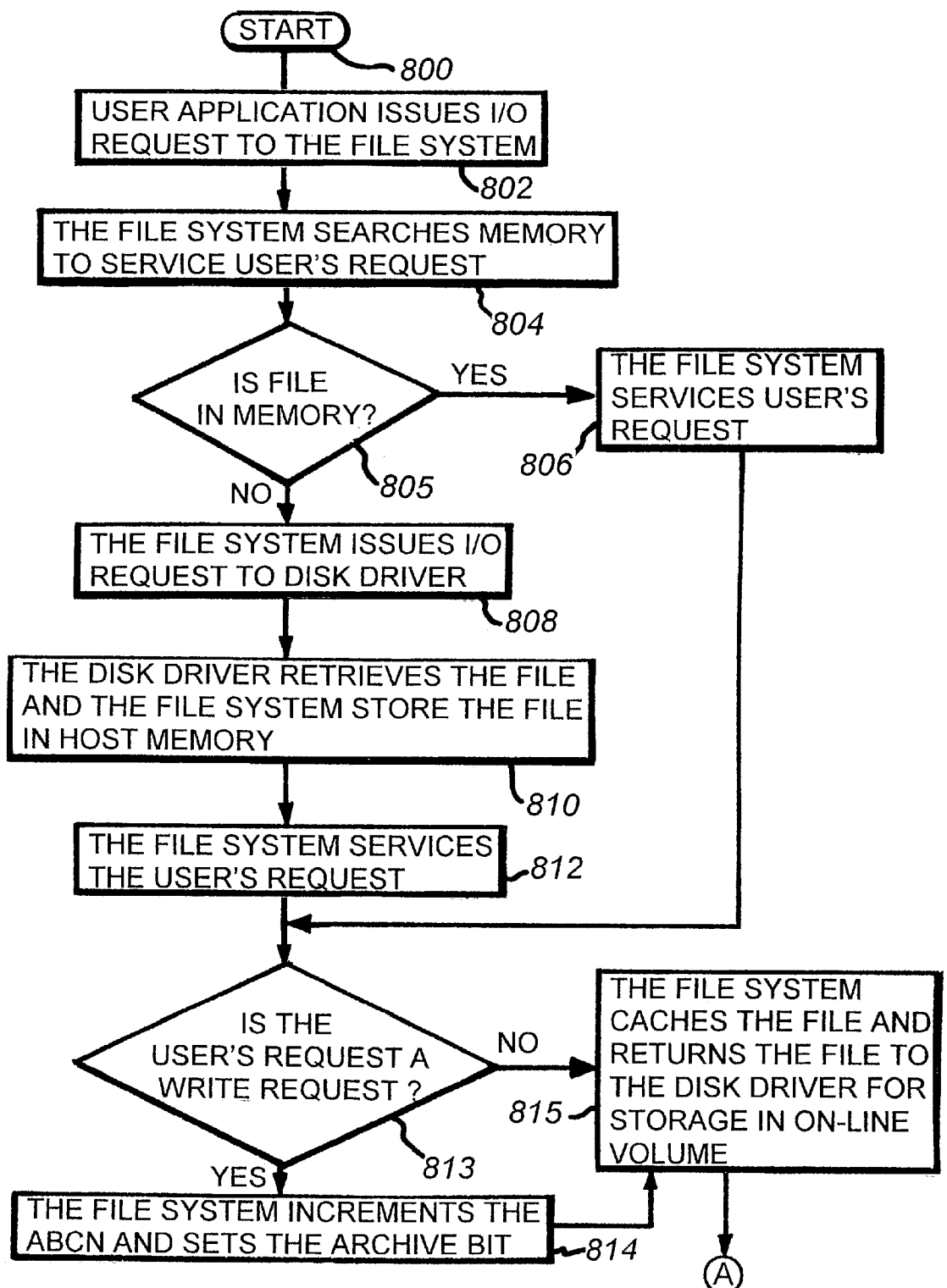
FIGS. 8A and 8B is a flowchart illustrating the sequence of steps followed by a backup process in the preferred embodiment in FIG. 7.

FIG. 8A is a flowchart illustrating the sequence of steps employed when performing an incremental backup operation on the single processor platform in accordance with the invention. The sequence starts at Step 800 and proceeds to Step 802 where the user application issues an I/O request (via an applications programming interface or function call) for a file to the file system 710. The file system 710 searches memory 706 for the file in Step 804 and if it is present in the memory 706 (Step 805), the file system 710 services the request at Step 806. If the file is not in memory 706(Step 805), the file system 710 issues an I/O request to an installed disk driver 708 in the I/O Unit 712 in Step 808. The disk driver 708 retrieves the file from an on-line container and the file system 710 forwards the file to the memory 706 in Step 810. In Step 812, the file system 710 services the user's request and, if the request is a write request(Step 813), increments the ABCN and asserts the archive bit(Step 814) prior to returning the file to the disk driver 708 for storage on the on-line container (Step 815). Preferably, copies of the file (i.e., the "on-line file") are cached in the host memory.

Figure 8B:
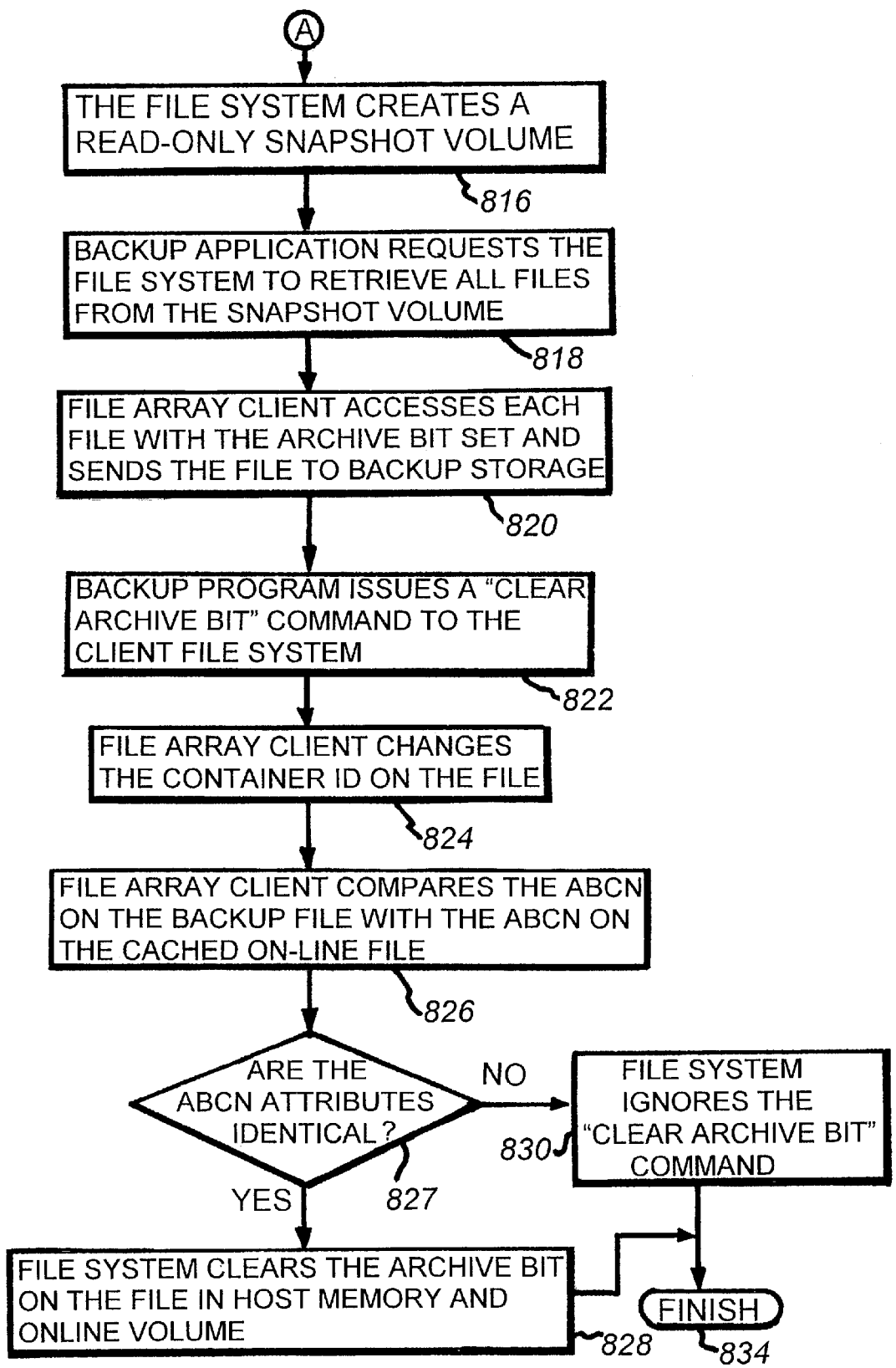

Thereafter in FIG. 8B, a system administrator instructs the file system 710 to perform a copy-on-write operation before executing the backup application 706. In response to this instruction, the file system 710 creates a read-only, snapshot container from the on-line container in Step 816. The backup application 706 then issues a request to the file system 710 to retrieve all files from the snapshot container in Step 818. The file system 710 accesses each file having an asserted archive bit and, in response to a backup instruction from the application, forwards each file through the appropriate disk driver 708 for storage on secondary storage (Step 820). The backup program 706 then issues a clear archive bit command to the file system 710 in Step 822 to clear the archive bit of the file (i.e., the "backed up file"). In response to this command, the file system 710 changes the container ID on that file from the snapshot container ID to the on-line container ID in Step 824. Note that if the copy of a modified file stored on the on-line container is further modified after the snapshot is taken, the file ID of the backed up file will be different from the on-line file ID, because the archive bit of the on-line file is reasserted and its ABCN is incremented by the file system 710.

In accordance with the invention, the file system then compares the ABCN of the backed up file with the ABCN of the cached on-line file in Step 826. If the ABCN attributes are identical (Step 827), the file system 710 clears the archive bit on the backed up file in Step 828. If the ABCN attributes are not identical, the file system ignores the clear archive bit command in Step 830. The file system 710 also executes the clear archive bit command and performs similar manipulation of these attributes associated with copies of the backed up and on-line files on the on-line container. The sequence for the incremental back up program then ends at Step 834.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for enabling accurate incremental backup operations initiated by a backup application for an on-line file of a computer system having an archive bit attribute associated with the file, the method comprising the steps of:

creating a snapshot file in a read-only container, and duplicating contents of the on-line file to the snapshot file, each file initially having an archive bit change number (ABCN) attribute of the same value;

modifying the on-line file to reflect changes by a user;

asserting the archive bit and incrementing the ABCN of the on-line file in response to the step of modifying;

backing up the contents of the snapshot file with the archive bit to a backup file on a secondary storage device;

issuing a clear archive bit command upon completion of an incremental backup operation directed to the snapshot file;

comparing the ABCN attribute of the on-line file with the ABCN attribute of the backup file;

maintaining assertion of the archive bit in the on-line file if the ABCN attributes of an on-line file ID and a snapshot file ID do not match; and clearing the archive bit in the on-line file if the ABCN attributes of the on-line file ID and the snapshot file ID match, thereby enabling an accurate incremental backup operation.

2. The method of claim 1 wherein the step of creating comprising changing a container ID in the snapshot file to a read-only container ID.

3. The method of claim 2 wherein the step of backing up comprises the steps of:

searching the read-only container for all files with their archive bits asserted; and copying each file with an asserted archive bit to a secondary storage device.

4. The method of claim 3 wherein the step of issuing comprises the steps of:

converting the container ID associated with the snapshot file to the container ID of an on-line container; and locating the on-line file with a same file ID as the snapshot file.

5. Apparatus for enabling incremental backup operations initiated by a backup application for an on-line file of an on-line computer system having an archive bit associated with the file, the apparatus comprising:

a file system;

means for creating a snapshot file in a read-only container, and duplicating contents of the on-line file to the snapshot file, each file initially having an archive bit change number (ABCN) attribute of the same value;

means for modifying the on-line file to reflect changes by a user;

means for asserting the archive bit and incrementing the ABCN of the on-line file in response to the step of modifying;

an application for backing up the contents of the snapshot file with the archive bit to a backup file on a secondary storage device;

means for issuing a clear archive bit command upon completion of an incremental backup operation directed to the snapshot file;

means for comparing the ABCN attribute of the on-line file with the ABCN attribute of the backup file;

means for maintaining assertion of the archive bit in the on-line file if the ABCN attributes of an on-line file ID and a snapshot file ID do not match; and means for clearing the archive bit in the on-line file if the ABCN attributes of the on-line file ID and the snapshot file ID match, thereby enabling an accurate incremental backup operation.

6. The apparatus of claim 5 wherein the means for creating comprises means for changing a container ID in the snapshot file to a read-only container ID.

7. The apparatus of claim 6 wherein the application for backing up comprises means for:

searching the read-only container for all files with their archive bits asserted; and copying each file with an asserted archive bit to a secondary storage device.

8. The apparatus of claim 7 wherein the means for issuing comprises means for:

converting the container ID associated with the snapshot file to the container ID of an on-line container; and locating the on-line file with a same file ID as the snapshot file.

* * * * *